(12) United States Patent
Boyde et al.

(10) Patent No.: US 10,690,076 B2
(45) Date of Patent: Jun. 23, 2020

(54) METHOD FOR COMPENSATING VALVE DRIFT IN AN INTERNAL COMBUSTION ENGINE

(71) Applicant: MTU FRIEDRICHSHAFEN GMBH, Friedrichshafen (DE)

(72) Inventors: Jan Boyde, Friedrichshafen (DE); Wolfgang Fimml, Hörbach (AT); Erika Schäfer, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/740,921

(22) PCT Filed: Jul. 7, 2016

(86) PCT No.: PCT/EP2016/001166
§ 371 (c)(1),
(2) Date: Dec. 29, 2017

(87) PCT Pub. No.: WO2017/016637
PCT Pub. Date: Feb. 2, 2017

(65) Prior Publication Data
US 2018/0195452 A1 Jul. 12, 2018

(30) Foreign Application Priority Data
Jul. 27, 2015 (DE) .......... 10 2015 214 179

(51) Int. Cl.
*F02D 41/14* (2006.01)
*F02D 41/18* (2006.01)
(Continued)

(52) U.S. Cl.
CPC ..... *F02D 41/1439* (2013.01); *F02D 13/0223* (2013.01); *F02D 41/1486* (2013.01);
(Continued)

(58) Field of Classification Search
CPC ............. F02D 41/1439; F02D 41/1486; F02D 13/0223; F02D 41/2451; F02D 41/18;
(Continued)

(56) References Cited

U.S. PATENT DOCUMENTS

| | | | |
|---|---|---|---|
| 5,597,951 A * | 1/1997 | Yoshizaki | F02D 41/1401 73/114.32 |
| 6,789,414 B2 * | 9/2004 | Fuwa | F02D 41/18 123/488 |

(Continued)

FOREIGN PATENT DOCUMENTS

| | | |
|---|---|---|
| DE | 10332698 A1 | 4/2004 |
| DE | 102005010785 A1 | 9/2006 |

(Continued)

*Primary Examiner* — Joseph J Dallo
(74) *Attorney, Agent, or Firm* — Lucas & Mercanti, LLP; Klaus P. Stoffel

(57) ABSTRACT

A method for compensating valve drift in an internal combustion engine having a variable valve train; in the method, an actual value of the current operating state of the internal combustion engine is determined in an air expenditure map and compared to a desired value of the air expenditure map, whereupon the air expenditure map is corrected.

10 Claims, 2 Drawing Sheets

(51) Int. Cl.
  *F02D 41/24*   (2006.01)
  *F02D 13/02*   (2006.01)
  *F02D 41/00*   (2006.01)
(52) U.S. Cl.
  CPC ......... *F02D 41/18* (2013.01); *F02D 41/2451* (2013.01); *F02D 41/0007* (2013.01); *F02D 41/0027* (2013.01); *F02D 2041/001* (2013.01); *F02D 2200/0411* (2013.01); *Y02T 10/18* (2013.01)
(58) Field of Classification Search
  CPC ....... F02D 2200/0411; F02D 2041/001; F02D 41/0007; F02D 41/0027; Y02T 10/18
  See application file for complete search history.

(56) References Cited

U.S. PATENT DOCUMENTS

| | | | | |
|---|---|---|---|---|
| 7,017,399 B2* | 3/2006 | Yokohata | ............... | G05B 17/02 73/114.31 |
| 7,107,978 B2* | 9/2006 | Itoyama | ............... | F02D 23/02 123/399 |
| 7,151,994 B2* | 12/2006 | Fuwa | ............... | F02D 41/18 701/114 |
| 7,162,356 B2* | 1/2007 | Fuwa | ............... | F01L 13/0015 123/478 |
| 7,546,200 B2* | 6/2009 | Justice | ............... | G01M 15/042 701/115 |
| 7,725,239 B2* | 5/2010 | Yasui | ............... | F02B 75/048 700/54 |
| 7,774,127 B2* | 8/2010 | Prunier | ............... | F02D 41/182 123/90.15 |
| 7,865,291 B2* | 1/2011 | Muller | ............... | F02D 41/1448 123/676 |
| 8,050,852 B2* | 11/2011 | Kato | ............... | F02D 41/1458 123/672 |
| 8,489,307 B2* | 7/2013 | Burkhardt | ............... | F02D 41/18 701/102 |
| 8,762,078 B2* | 6/2014 | Tsukamoto | ............... | F02D 41/18 702/45 |
| 8,818,689 B2* | 8/2014 | Oie | ............... | F02D 41/0002 123/399 |
| 9,322,323 B2* | 4/2016 | Panciroli | ............... | F02B 37/127 |
| 9,541,012 B2* | 1/2017 | Saito | ............... | F02D 23/00 |
| 9,708,995 B2* | 7/2017 | Yoshikawa | ............... | F02D 41/18 |
| 2002/0107630 A1 | 8/2002 | Yagi | | |
| 2007/0119172 A1* | 5/2007 | Barbe | ............... | F02D 41/005 60/605.2 |
| 2007/0227139 A1* | 10/2007 | Withrow | ............... | F01N 11/002 60/599 |
| 2009/0024300 A1* | 1/2009 | Turin | ............... | F02D 41/18 701/103 |
| 2009/0084348 A1* | 4/2009 | Batenburg | ............... | F02D 35/023 123/294 |
| 2010/0132661 A1* | 6/2010 | Klein | ............... | F02D 19/081 123/299 |
| 2011/0184632 A1* | 7/2011 | Kang | ............... | F02D 41/0007 701/109 |
| 2013/0080020 A1* | 3/2013 | Bleile | ............... | G06F 19/00 701/101 |
| 2013/0226435 A1* | 8/2013 | Wasberg | ............... | F02D 21/08 701/102 |
| 2013/0343421 A1* | 12/2013 | Yanakiev | ............... | F02D 41/18 374/1 |
| 2015/0134230 A1* | 5/2015 | Hoffmeyer | ............... | F02D 41/0002 701/103 |
| 2016/0076471 A1* | 3/2016 | Bayer | ............... | F02D 13/0226 123/90.15 |
| 2016/0230685 A1* | 8/2016 | Mercuri | ............... | F01N 3/0885 |
| 2016/0369718 A1* | 12/2016 | Pursifull | ............... | F01M 13/00 |
| 2017/0101946 A1* | 4/2017 | Conte | ............... | F02D 41/0052 |
| 2018/0355786 A1* | 12/2018 | Svensson | ............... | F02B 21/00 |
| 2019/0040791 A1* | 2/2019 | Ulrey | ............... | F02M 26/07 |

FOREIGN PATENT DOCUMENTS

| | | |
|---|---|---|
| DE | 102013202640 A1 | 8/2013 |
| DE | 102012004554 A1 | 9/2013 |
| JP | 2001123877 A | 5/2001 |

* cited by examiner

METHOD FOR COMPENSATING VALVE DRIFT IN AN INTERNAL COMBUSTION ENGINE

The present application is a 371 of International application PCT/EP2016/001166, filed Jul. 7, 2016, which claims priority of DE 10 2015 214 179.9, filed Jul. 27, 2015, the priority of these applications is hereby claimed and these applications are incorporated herein by reference.

BACKGROUND OF THE INVENTION

The invention relates to a method for compensating valve drift in an internal combustion engine having a variable valve drive.

In internal combustion engines which are operated with gas, the necessary mixture mass of air and gas is determined using a volumetric efficiency characteristic diagram. Such engine control functions very reliably with a rigid valve drive.

However, with a variable valve drive changes occur in the valve behavior during the operation of the internal combustion engine. These changes are also referred to as valve drift. These changes can be caused by external influences or by ageing processes in a valve or in the valve control, as a result of which changes occur in the opening behavior or the closing behavior. For example, the changes in the valve behavior can be caused by the hydraulic components or by the masses to be moved. Further causes can be e.g. changes in the friction conditions, wear of the valve plates or surface roughening of the valve plates. As a result, the volumetric efficiency characteristic diagram is no longer up to date and therefore the mixture mass can no longer be determined with sufficient precision. This influences the running behavior of the internal combustion engine and its efficiency. A mixture mass which is adapted to the respective operating conditions of the internal combustion engine gives rise to knocking or misfires.

SUMMARY OF THE INVENTION

The invention is based on the object of providing a method for compensating valve drift in an internal combustion engine, which method permits precise feeding of the mixture quantity with a simple design and easy, cost-effective implementation.

According to the invention there is therefore provision that in an internal combustion engine, in particular a gas engine, with variable valve drive, an actual value of the instantaneous operating state of the internal combustion engine is determined by means of a mass flow sensor. In a volumetric efficiency characteristic diagram of the internal combustion engine, this actual value is compared with the associated setpoint value of the volumetric efficiency characteristic diagram. The volumetric efficiency characteristic diagram is corrected on the basis of the resulting difference.

With the method according to the invention, the advantage is therefore obtained that the determination of the mixture quantity can be carried out directly by means of a volumetric efficiency characteristic diagram. This has the large advantage that the mixture quantity can be determined quickly and precisely. Whereas in the sensors which are known from the prior art the determination of the mixture quantity is too slow, and in many ranges too imprecise to correct valve drift, according to the invention a method is provided which permits the desired correction very easily.

In one preferred refinement of the invention there is provision that the correction of the characteristic diagram is carried out by shifting the characteristic diagram, i.e. the respective lines of the setpoint values of the characteristic diagram. This shifting can be performed very easily in a computational fashion. In one alternative refinement of the invention, the correction is carried out by adding a correction factor. This also results in shifting or adaptation of the characteristic diagram to the present operating behavior of the internal combustion engine.

It is particularly favorable if according to the invention the air/gas mixture mass flow is measured in an intake path of the internal combustion engine by means of the mass flow sensor. In this context, the advantage is obtained that there is sufficient installation space in the intake path for the installation of the mass flow sensor. In addition, the measurement is not affected by interference operating parameters, for example pressure waves, vibrations or the like.

It is particularly favorable if the measurement by means of the mass flow sensor is carried out in the intake path downstream of a gas feed into the intake path. Downstream of the gas feed there is a stable mixture present which can be determined reliably by the mass flow sensor.

In the method according to the invention, the measurement by means of the mass flow sensor is preferably carried out upstream of a compressor which is arranged in the intake path. This prevents pressure waves of the compressor from adversely affecting the measurement.

The method according to the invention can be applied, in particular, in stationary gas engines, but can be used generally for all types of gas engines.

In a particularly advantageous way, the method according to the invention can be carried out during a stationary operation state of the internal combustion engine. This stationary operating state occurs, in particular, if the operation does not experience any change in load over a time period of longer than 30 seconds. There can also be provision that according to the invention the system waits for a steady state in a quiet engine phase of several minutes until the measurement according to the invention is carried out.

According to the invention, as a result of the correction of the characteristic diagram the charge pressure and/or the rotational speed of the internal combustion engine can be changed or corrected, in order to compensate the valve drift.

The invention has been explained above on the basis of a mass flow sensor. According to the invention, different types of such sensors or probes can be used, for example also cylinder pressure sensors, in order to determine the air/gas mixture mass flow.

The method according to the invention therefore ensures that the volumetric efficiency characteristic diagram of the internal combustion engine maintains its precision and therefore the mixture quantity can be determined quickly and precisely.

A further advantage of the application of the method according to the invention is also that measuring errors or sensor errors of further sensors which can used to perform open-loop or closed-loop control of the internal combustion engine can be determined.

BRIEF DESCRIPTION OF THE DRAWING

The invention will be described below on the basis of an exemplary embodiment in conjunction with the drawing, in which.

DETAILED DESCRIPTION OF THE INVENTION

Figure 1:
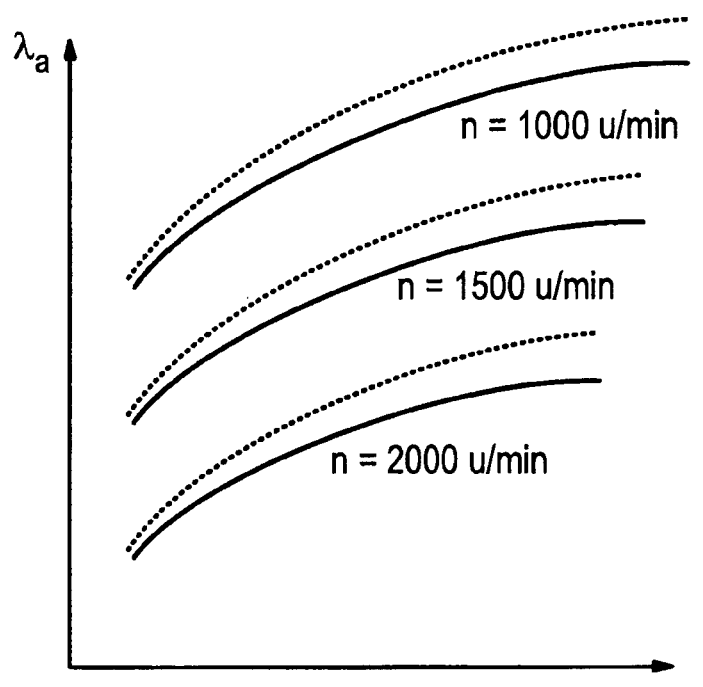
FIG. 1 shows a schematic illustration of a volumetric efficiency characteristic diagram.

FIG. 1 shows a volumetric efficiency characteristic diagram in which the closing time of an inlet valve is illustrated on the abscissa, while the ordinate represents the volumetric efficiency. The values for individual rotational speeds of the internal combustion engine are illustrated with a continuous line in the diagram. The dotted line shows a corrected characteristic diagram which has been corrected on the basis of the method according to the invention by shifting the characteristic diagram or by adding a correction factor. If, for example in the case of large inlet closure angles, the restoring force of the valve decreases, for example as a result of valve wear of the valve spring, an increase occurs in the volumetric efficiency. This increase can be determined with a comparison of the respective actual value with the setpoint value. As a result it becomes clear that the setpoint characteristic diagram is not being complied with. The correction provided according to the invention is therefore carried out.

Figure 2:
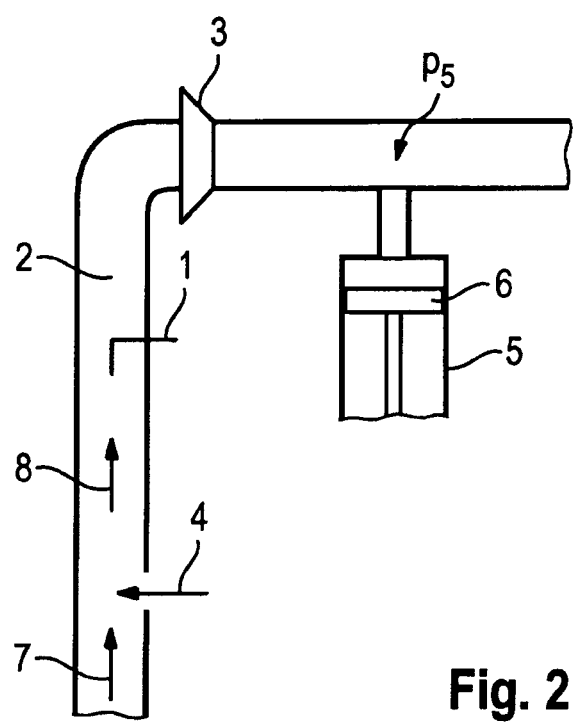
FIG. 2 shows a schematic illustration of the structural application of the method according to the invention.

FIG. 2 shows a schematic illustration of a cylinder 5 of an internal combustion engine having a piston 6. Air 7 is fed in through an intake path 2. Gas is added to this air 7 by means of a gas feed 4, with the result that a gas/air mixture 8 is produced. This gas/air mixture 8 is fed to a mass flow sensor 1 which carries out the measurement according to the invention. The mass flow sensor 1 is arranged upstream of a compressor 3 in the intake path 2. A charge pressure $p_5$ is present downstream of the compressor 3. The gas feed 4 or the air feed 7 is controlled for compensating valve drift as a function of the measured values of the mass flow sensor 1.

Figure 3:
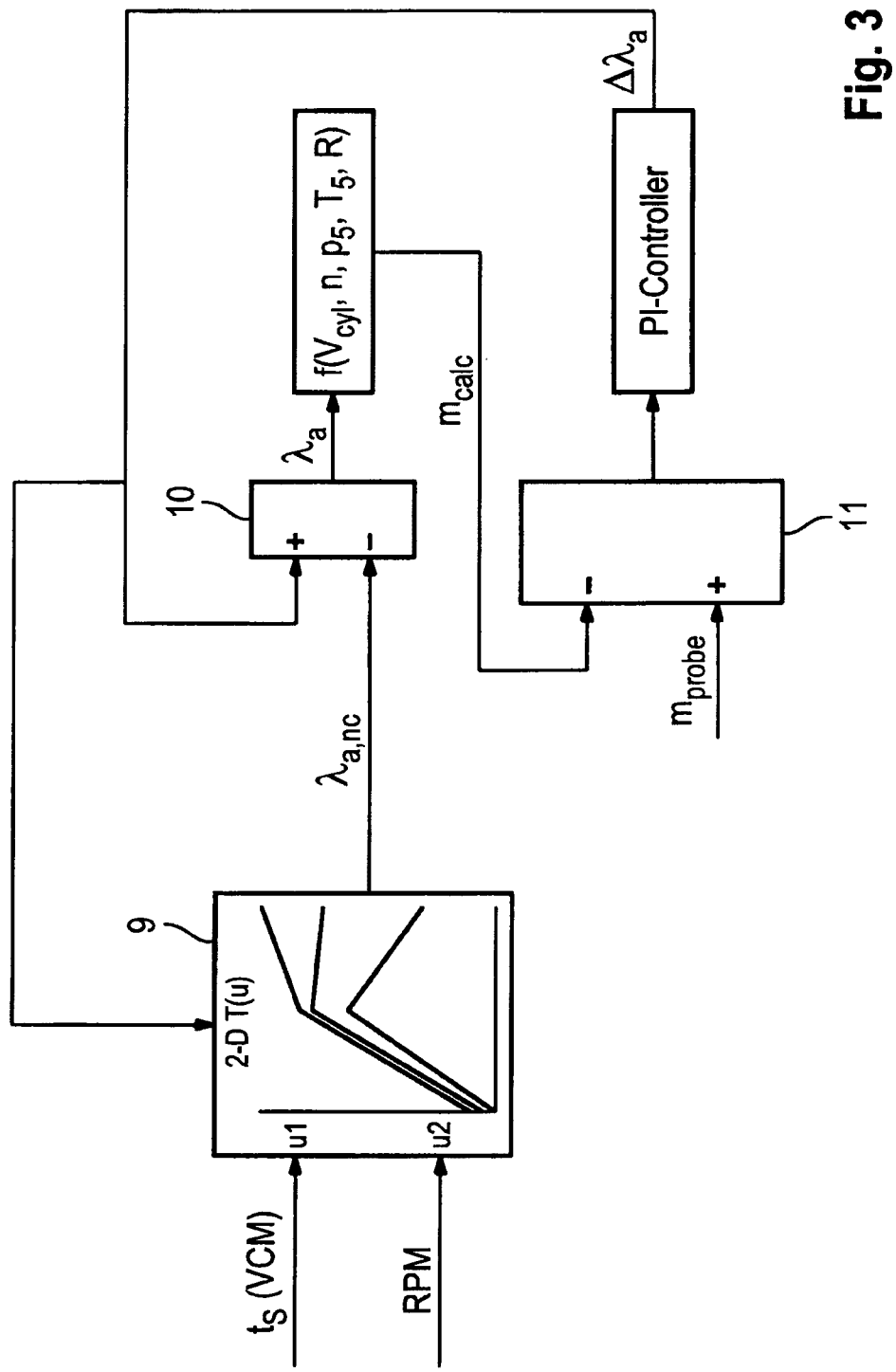
FIG. 3 shows a flowchart of the method sequence according to the invention.

FIG. 3 shows a simplified flow chart of the method according to the invention. Here, a characteristic diagram 9, to which the rotational speed of the internal combustion engine (RPM) and the closing angle of the inflow valve ($t_s$(VCM)) are fed as input variables, is illustrated schematically. A volumetric efficiency $\lambda_{a,nc}$, which is not yet corrected, is obtained from the characteristic diagram. This value for the volumetric efficiency is fed to an electronic circuit 10 which outputs a volumetric efficiency $\lambda_a$ which is corrected by the fed-in value $\Delta\lambda_{a,nc}$. By using this value for the volumetric efficiency, an air mass flow $m_{calc}$ is calculated, which air mass flow $m_{calc}$ is fed to an electronic circuit 11, to which a value for the measured air mass flow $m_{probe}$ is also fed. The value for the measured air mass flow $m_{probe}$ is output by the mass flow sensor 1 and is considered to be correct. The deviation in the volumetric efficiency $\lambda_a$ is measured by means of a PI controller and is fed, on the one hand, to the electronic circuit 10 and, on the other, to the characteristic diagram for characteristic diagram correction.

The invention claimed is:

1. A method for compensating valve drift in an internal combustion engine having a variable valve drive, the method comprising the steps of: determining an actual value of an instantaneous operating state of the internal combustion engine in a volumetric efficiency characteristic diagram, which volumetric efficiency characteristic diagram provides an air consumption in dependence on a closing point in time of an inlet valve, using a mass flow sensor; comparing the actual valve with a setpoint value of the volumetric efficiency characteristic diagram to determine a difference; and compensating the valve drift by subsequently correcting the volumetric efficiency characteristic diagram based on the difference.

2. The method according to claim 1, wherein the step of correcting the volumetric efficiency characteristic diagram includes shifting the volumetric efficiency characteristic diagram.

3. The method according to claim 1, wherein the step of correcting the volumetric efficiency characteristic diagram includes adding a correction factor.

4. The method according to claim 1, including measuring air/gas mixture mass flow in an intake path using the mass flow sensor.

5. The method according to claim 1, including carrying out measurement by the mass flow sensor in an intake path adjacent to a gas feed into the intake path.

6. The method according to claim 1, including carrying out measurement by the mass flow sensor upstream of a compressor arranged in an intake path.

7. The method according to claim 1, including applying the method in a stationary gas engine.

8. The method according to claim 1, including carrying out the method during a stationary operating state of the internal combustion engine.

9. The method according to claim 8, including carrying out the method during a stationary mode which lasts over a time period of longer than 30 seconds.

10. The method according to claim 1, wherein during the step of correcting the volumetric efficiency characteristic diagram charge pressure and/or rotational speed of the internal combustion engine are changed.

* * * * *